(12) United States Patent
Rozner et al.

(10) Patent No.: US 12,373,972 B2
(45) Date of Patent: Jul. 29, 2025

(54) CAMERA CALIBRATION AND DISTANCE MEASUREMENT USING PARALLEL LINES

(71) Applicant: Johnson Controls Tyco IP Holdings LLP, Milwaukee, WI (US)

(72) Inventors: Amit Rozner, Yehud (IL); Yohay Falik, Petah Tiqwa (IL); Calanit Dotan, Tel Aviv (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 71 days.

(21) Appl. No.: 18/516,070

(22) Filed: Nov. 21, 2023

(65) Prior Publication Data

US 2024/0177330 A1    May 30, 2024

Related U.S. Application Data

(60) Provisional application No. 63/384,845, filed on Nov. 23, 2022.

(51) Int. Cl.
   *G06T 7/60*         (2017.01)
   *G06T 7/50*         (2017.01)
   (Continued)

(52) U.S. Cl.
   CPC .............. *G06T 7/60* (2013.01); *G06T 7/50* (2017.01); *G06T 7/80* (2017.01); *H04N 17/002* (2013.01); *G06T 2207/30244* (2013.01)

(58) Field of Classification Search
   CPC .... G06T 7/50; G06T 7/60; G06T 7/80; G06T 7/85; G06T 2207/30244; H04N 17/002
   See application file for complete search history.

(56) References Cited

U.S. PATENT DOCUMENTS

| | | | |
|---|---|---|---|
| 8,624,546 B2 * | 1/2014 | Jung | H04B 5/79 320/108 |
| 8,872,925 B2 * | 10/2014 | Xie | G06T 7/80 348/207.99 |

(Continued)

OTHER PUBLICATIONS

International Search Report and Written Opinion for International Application No. PCT/US2023/080888, mailed Mar. 4, 2024 (13 pages).

(Continued)

*Primary Examiner* — Brian P Yenke
(74) *Attorney, Agent, or Firm* — ArentFox Schiff LLP

(57) ABSTRACT

Example implementations include a method, apparatus and computer-readable medium for estimating a real world distance in an image, comprising obtaining an image from a camera installed in an environment and identifying, in the image, a first set of parallel lines on a real world ground plane and a second set of parallel lines on the real world ground plane. The implementations include determining a first intersection point of the first set of parallel lines and a second intersection point of the second set of parallel lines, identifying a ground line connecting the first intersection point and the second intersection point, and estimating an internal camera matrix based on a focal length and an image size associated with the camera. The implementations include calibrating the camera for real world distance measurement by determining a perpendicular vector to the ground line based on the internal camera matrix.

19 Claims, 10 Drawing Sheets

(51) Int. Cl.
*G06T 7/80* (2017.01)
*H04N 17/00* (2006.01)

(56) References Cited

U.S. PATENT DOCUMENTS

| | | | | |
|---|---|---|---|---|
| 9,158,972 | B2* | 10/2015 | Datta | G06V 20/52 |
| 9,322,647 | B2* | 4/2016 | Datta | G06T 5/80 |
| 9,875,542 | B2 | 1/2018 | Ikeda | |
| 9,876,542 | B2* | 1/2018 | Sampath | H04L 1/0035 |
| 10,291,094 | B2 | 5/2019 | Finn | |
| 10,291,904 | B2* | 5/2019 | Finn | G01S 7/4972 |
| 10,372,970 | B2 | 8/2019 | Wang | |
| 10,796,448 | B2 | 10/2020 | Lee | |
| 10,885,667 | B2 | 1/2021 | Paik et al. | |
| 11,138,712 | B2 | 10/2021 | Frei | |
| 11,321,872 | B2 | 5/2022 | Lipchin | |
| 11,631,197 | B2* | 4/2023 | Corona | G06T 7/20 |
| | | | | 348/135 |
| 12,073,588 | B2 | 8/2024 | Parchami | |
| 12,094,172 | B2* | 9/2024 | Chang | G06T 7/80 |
| 2010/0134688 | A1* | 6/2010 | Moriwake | G06T 15/506 |
| | | | | 345/426 |
| 2018/0116556 | A1 | 5/2018 | Zhang | |
| 2021/0019914 | A1* | 1/2021 | Lipchin | G06V 10/25 |
| 2021/0366146 | A1 | 11/2021 | Khamis | |
| 2022/0051437 | A1 | 2/2022 | Ostadabbas | |
| 2022/0108473 | A1 | 4/2022 | Corona et al. | |
| 2023/0128689 | A1 | 4/2023 | Qian | |
| 2023/0145701 | A1* | 5/2023 | Parchami | G06N 3/0464 |
| | | | | 382/103 |
| 2024/0169589 | A1* | 5/2024 | Rozner | H04N 17/002 |
| 2024/0169712 | A1 | 5/2024 | Chen | |
| 2024/0185443 | A1 | 6/2024 | Huang | |

OTHER PUBLICATIONS

International Search Report and Written Opinion for International Application No. PCT/US2023/080895, mailed Mar. 4, 2024 (14 pages).

Criminisi et al., "New approach to obtain height measurements from video," Proc. SPIE 3576, Investigation and Forensic Science Technologies, Feb. 4, 1999, pp. 227-238.

Lv et al., "Camera calibration from video of a walking human," EEE Transactions on Pattern Analysis and Machine Intelligence, vol. 28, No. 9, Sep. 2006, pp. 1513-1518.

* cited by examiner

CAMERA CALIBRATION AND DISTANCE MEASUREMENT USING PARALLEL LINES

CROSS-REFERENCE TO RELATED APPLICATIONS

This application claims the benefit of U.S. Provisional Application No. 63/384,845, filed Nov. 23, 2022, which is herein incorporated by reference.

BACKGROUND

Technical Field

The described aspects relate to camera and computer vision systems.

Introduction

Height estimation is useful in many world applications. For example, the heights of vehicles may be estimated for when height restrictions exist (e.g., tunnels, bridges, etc.). In another example, height may be used by security applications to distinguish children from adults. In terms of computer vision, estimating object height from a single image requires camera calibration parameters (both intrinsic and extrinsic matrices). Camera calibration is the process of determining camera parameters in order to complete operations with specified performance measurements. Unfortunately, the calibration process is often complicated and not always possible on the field.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for estimating a real world distance in an image, comprising obtaining a first image from a camera installed at an unknown height in an environment, wherein the first image includes a first object at a first location in the environment, wherein the first object has a known object height. The method further includes estimating, using a homography matrix that transforms an image plane associated with the image to a real world plane, a first position of a first point on the first object in the first image based on a real world ground plane. Additionally, the method further includes determining, based on the known object height, a first vector that intersects with a second point on the first object and points to the real world ground plane. Additionally, the method further includes obtaining a second image from the camera, wherein the second image includes the first object at a second location in the environment. Additionally, the method further includes estimating, using the homography matrix, a second position of the first point on the first object in the second image based on the real world ground plane. Additionally, the method further includes determining, based on the known object height, a second vector that intersects with the second point on the first object in the second image and points to the second real world ground plane. Additionally, the method further includes calibrating the camera by determining a height of the center of a camera lens of the camera using an intersection of the first vector and the second vector.

Another example aspect includes an apparatus for estimating a real world distance in an image, comprising a memory and a processor coupled with the memory. The processor is configured to obtain a first image from a camera installed at an unknown height in an environment, wherein the first image includes a first object at a first location in the environment, wherein the first object has a known object height. The processor is further configured to estimate, using a homography matrix that transforms an image plane associated with the image to a real world plane, a first position of a first point on the first object in the first image based on a real world ground plane. Additionally, the processor further configured to determine, based on the known object height, a first vector that intersects with a second point on the first object and points to the real world ground plane. Additionally, the processor further configured to obtain a second image from the camera, wherein the second image includes the first object at a second location in the environment. Additionally, the processor further configured to estimate, using the homography matrix, a second position of the first point on the first object in the second image based on the real world ground plane. Additionally, the processor further configured to determine, based on the known object height, a second vector that intersects with the second point on the first object in the second image and points to the real world ground plane. Additionally, the processor further configured to calibrate the camera by determining a height of the center of a camera lens of the camera using an intersection of the first vector and the second vector.

Another example aspect includes an apparatus for estimating a real world distance in an image, comprising means for obtaining a first image from a camera installed at an unknown height in an environment, wherein the first image includes a first object at a first location in the environment, wherein the first object has a known object height. The apparatus further includes means for estimating, using a homography matrix that transforms an image plane associated with the image to a real world plane, a first position of a first point on the first object in the first image based on a real world ground plane. Additionally, the apparatus further includes means for determining, based on the known object height, a first vector that intersects with a second point on the first object and points to the real world ground plane. Additionally, the apparatus further includes means for obtaining a second image from the camera, wherein the second image includes the first object at a second location in the environment. Additionally, the apparatus further includes means for estimating, using the homography matrix, a second position of the first point on the first object in the second image based on the real world ground plane. Additionally, the apparatus further includes means for determining, based on the known object height, a second vector that intersects with the second point on the first object in the second image and points to the second real world ground plane. Additionally, the apparatus further includes means for calibrating the camera by determining a height of the center of a camera lens of the camera using an intersection of the first vector and the second vector.

Another example aspect includes a computer-readable medium having instructions stored thereon for estimating a real world distance in an image, wherein the instructions are executable by a processor to obtain a first image from a camera installed at an unknown height in an environment, wherein the first image includes a first object at a first location in the environment, wherein the first object has a known object height. The instructions are further executable to estimate, using a homography matrix that transforms an image plane associated with the image to a real world plane, a first position of a first point on the first object in the first image based on a real world ground plane. Additionally, the instructions are further executable to determine, based on the known object height, a first vector that intersects with a second point on the first object and points to the real world ground plane. Additionally, the instructions are further executable to obtain a second image from the camera, wherein the second image includes the first object at a second location in the environment. Additionally, the instructions are further executable to estimate, using the homography matrix, a second position of the first point on the first object in the second image based on the real world ground plane. Additionally, the instructions are further executable to determine, based on the known object height, a second vector that intersects with the second point on the first object in the second image and points to the second real world ground plane. Additionally, the instructions are further executable to calibrate the camera by determining a height of the center of a camera lens of the camera using an intersection of the first vector and the second vector.

An example aspect includes a method for estimating a real world distance in an image, comprising obtaining an image from a camera installed in an environment. The method further includes identifying, in the image, a first set of parallel lines on a real world ground plane and a second set of parallel lines on the real world ground plane. Additionally, the method further includes determining a first intersection point of the first set of parallel lines and a second intersection point of the second set of parallel lines. Additionally, the method further includes identifying a ground line connecting the first intersection point and the second intersection point. Additionally, the method further includes estimating an internal camera matrix based on a focal length and an image size associated with the camera. Additionally, the method further includes calibrating the camera for real world distance measurement by determining a perpendicular vector to the ground line based on the internal camera matrix.

Another example aspect includes an apparatus for estimating a real world distance in an image, comprising a memory and a processor coupled with the memory. The processor is configured to obtain an image from a camera installed in an environment. The processor is further configured to identify, in the image, a first set of parallel lines on a real world ground plane and a second set of parallel lines on the real world ground plane. Additionally, the processor further configured to determine a first intersection point of the first set of parallel lines and a second intersection point of the second set of parallel lines. Additionally, the processor further configured to identify a ground line connecting the first intersection point and the second intersection point. Additionally, the processor further configured to estimate an internal camera matrix based on a focal length and an image size associated with the camera. Additionally, the processor further configured to calibrate the camera for real world distance measurement by determining a perpendicular vector to the ground line based on the internal camera matrix.

Another example aspect includes an apparatus for estimating a real world distance in an image, comprising means for obtaining an image from a camera installed in an environment. The apparatus further includes means for identifying, in the image, a first set of parallel lines on a real world ground plane and a second set of parallel lines on the real world ground plane. Additionally, the apparatus further includes means for determining a first intersection point of the first set of parallel lines and a second intersection point of the second set of parallel lines. Additionally, the apparatus further includes means for identifying a ground line connecting the first intersection point and the second intersection point. Additionally, the apparatus further includes means for estimating an internal camera matrix based on a focal length and an image size associated with the camera. Additionally, the apparatus further includes means for calibrating the camera for real world distance measurement by determining a perpendicular vector to the ground line based on the internal camera matrix.

Another example aspect includes a computer-readable medium having instructions stored thereon for estimating a real world distance in an image, wherein the instructions are executable by a processor to obtain an image from a camera installed in an environment. The instructions are further executable to identify, in the image, a first set of parallel lines on a real world ground plane and a second set of parallel lines on the real world ground plane. Additionally, the instructions are further executable to determine a first intersection point of the first set of parallel lines and a second intersection point of the second set of parallel lines. Additionally, the instructions are further executable to identify a ground line connecting the first intersection point and the second intersection point. Additionally, the instructions are further executable to estimate an internal camera matrix based on a focal length and an image size associated with the camera. Additionally, the instructions are further executable to calibrate the camera for real world distance measurement by determining a perpendicular vector to the ground line based on the internal camera matrix.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes systems and methods to calibrate a camera and to measure real world distances, such as height, in an image captured by the camera. In one approach, the calibration for subsequent measurement is performed using image to ground homography. In another approach, the calibration for subsequent measurement is performed using parallel lines on the ground in the image, along with a camera focal length and an object of known height in the image. In either approach, the calibrated camera can then be used to estimate a height and/or size of other objects in an image captured by the camera. In general, the approaches may be used to estimate any distance in a plane perpendicular to the plane on which the homography is calculated (e.g., the ground plane). Conventional cameras are unable to estimate height using a single image due to a lack of proper calibration. Achieving the proper calibration, as specifically described in the present disclosure, can thus improve camera technology and enable accurate height estimations.

The described aspects provide a simple and efficient technique, as compared to prior complicated and intensive techniques, for calibrating a camera to determine real world measurements. For instance, estimating object height from a single image requires full camera calibration parameters (both intrinsic and extrinsic matrices). Such a full calibration process is complicated and not always possible in the field. The described aspects include two approaches for height estimation with two calibration processes. The calibration processes provide sufficient calibration parameters to provide accurate estimations that can be used to estimate object measurements. The described aspects may be useful in many practical applications. For instance, height estimation from a security camera might be useful in many world applications, including estimating heights for vehicles when height restriction exists, such as in the case of vehicles going under bridges, or for child detection by person height estimation, such as in the case of limiting access to prohibited/dangerous areas.

Figure 1A:
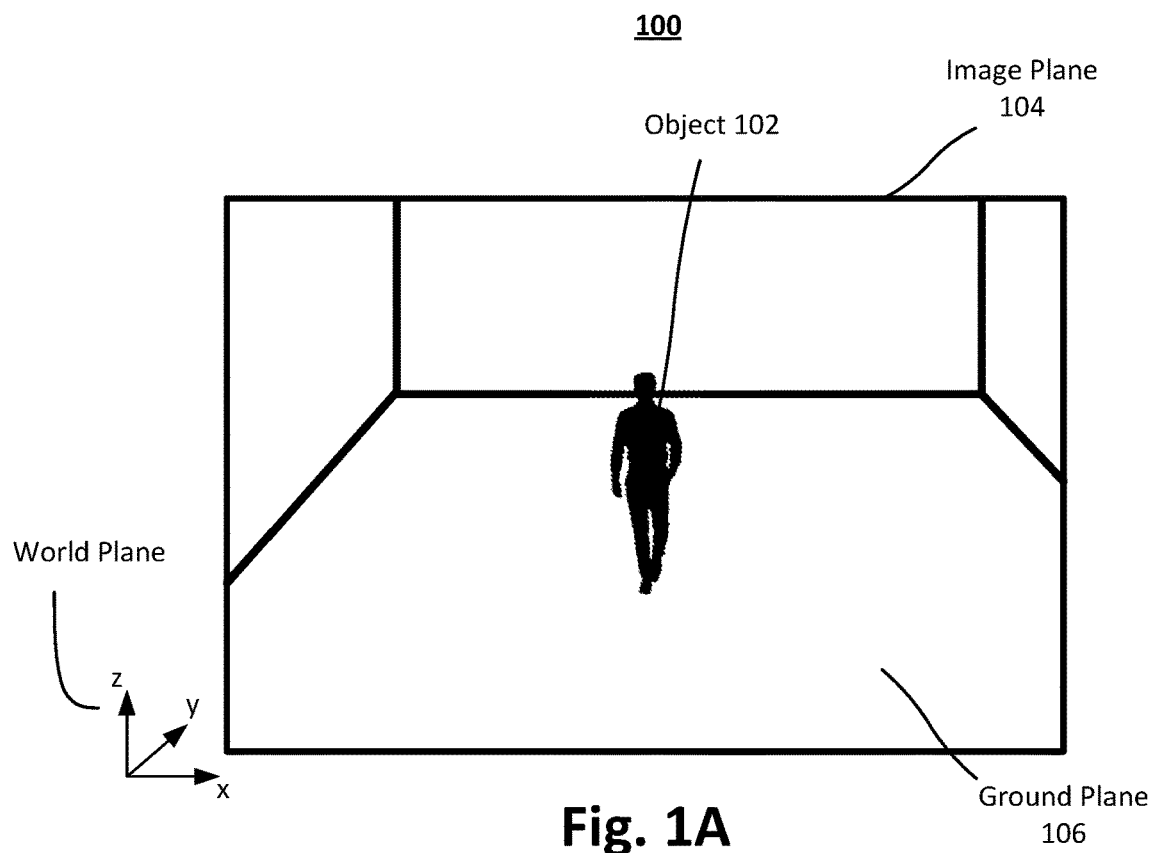
FIG. 1A is an image of an object captured by a camera to be calibrated.

Referring to FIG. 1A, an image 100 of an object 102 is captured by a camera 103 to be calibrated. Image 100 is bound by image plane 104. An x-y-z axis reference of a real world coordinate system (referred to as a world plane) is shown in FIG. 1A. Image plane 104 and ground plane 106 may be any plane in the x-y-z space. For simplicity, suppose that image plane 104 is parallel to the x-z plane and ground plane 106 is parallel to the x-y plane. It should be noted that depending on the position of the camera 103 installed in the environment, the tilt of the camera 103, the curvature of the floor, etc., the representation of image plane 104 and ground plane 106 may be not be as simplistic as described. Nevertheless, the algorithms and execution of the systems and methods in the present disclosure still apply to complicated representations of image plane 104 and ground plane 106.

In some aspects, calibration parameters include intrinsic parameters (e.g., focal length), which do not depend on the camera position relative to the real world coordinate system, and extrinsic parameters which describe the orientation and location of the camera 103 (e.g., rotation and translation of the camera 103 with respect to some real world coordinate system).

To estimate the calibration parameters, 3-D world points and their corresponding 2-D image points are utilized. To get these correspondences, multiple images of a calibration pattern can be used. By the correspondences, the calibration parameters can be determined.

Regarding the correspondences, a planar homography matrix relates the transformation between two planes (up to a scale factor). For example, the transformation between some world plane to the image plane. To convert between a point on image plane 104 and ground plane 106, a homography matrix H is utilized. The homography matrix provides partial information about the calibration parameters.

A simple process to find the homography matrix is by matching at least four unique 3-D world points on a real world plane with their corresponding 2-D image points on the image plane. For example, if the homography matrix for an image-to-world ground plane is needed, the chosen points should be on the ground, and homography enables calculating the world location of all the image points on the ground. Given the homography matrix that converts points from an image plane to a ground plane, and two images of an object with known height, the present disclosure describes calibrating a camera 103 and using the calibration to estimate sizes of arbitrary objects captured by the calibrated camera 103.

Figure 2:
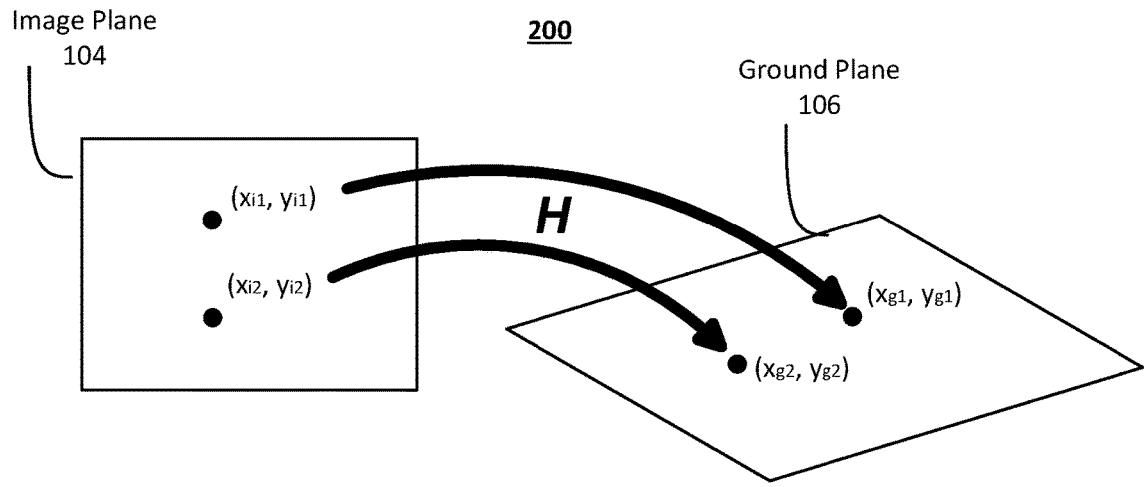
FIG. 2 is a diagram showing points on an image plane being mapped to points on a ground plane using a homography matrix.

FIG. 2 is a diagram 200 showing points on an image plane being mapped to points on a ground plane using a homography matrix. For example, point $(x_{i1}, y_{i1})$ may represent the top most point on object 102 and point $(x_{i2}, y_{i2})$ may represent the bottom most point (aligned with the top most point along the z-axis) on object 102. These points on image plane 104 represent the perspective of a camera, which does not have a sense of depth. Homography matrix H may be used to convert point $(x_{i1}, y_{i1})$ to point $(x_{g1}, y_{g1})$ and point $(x_{i2}, y_{i2})$ to point $(X_{g2}, y_{g2})$ on ground plane 106. Points $(x_{g1}, y_{g1})$ and $(X_{g2}, y_{g2})$ are positions of the image plane points in a real world plane. However, it is evident that even if $(x_{i2}, y_{i2})$ is a point on the ground and is accurately positioned as $(x_{g2}, y_{g2})$ on ground plane 106, the height associated with point $(x_{i1}, y_{i1})$ is not represented by $(x_{g1}, y_{g1})$. Point $(x_{i1}, y_{i1})$ should also be mapped to $(x_{g2}, y_{g2})$ because the top point of object 102 is positioned on the same point as the bottom point of object 102. However, the height properties of object 102 cause the mapping to be to $(x_{g1}, y_{g1})$.

In the first approach, image to ground homography and two images of an object of known size are used to calibrate the camera 103, which can then be used to estimate real world distances on the vertical axis (e.g., object height) in an image. In this approach, a calibration component installed on a computing device (e.g., the camera 103 itself or a server connected to the camera 103) is configured to obtain a first image and estimate two world points. The first is $a_1=(x_1, y_1, 0)$, where $a_1$ is the bottom-most point on the object (e.g., the feet location of a person). Point $a_1$ corresponds to point $(x_{g2}, y_{g2})$ in FIG. 2. The calibration component estimates $a_1$ using the homography matrix H and, for example, an object bottom-most point, (e.g., a foot or feet position in a case of the object being a person) in pixels on the image plane. The second point is $p_1$, which is the intersection of the ground and a ray $r_1$ extending from the camera center to the top-most point of the object (e.g., a top of a head of a person). The calibration component calculates $p_1$ using the homography matrix H and, for example, the head position in pixels on the image plane. Point $p_1$ corresponds to point $(x_{g1}, y_{g1})$ in FIG. 2.

Figure 3A:
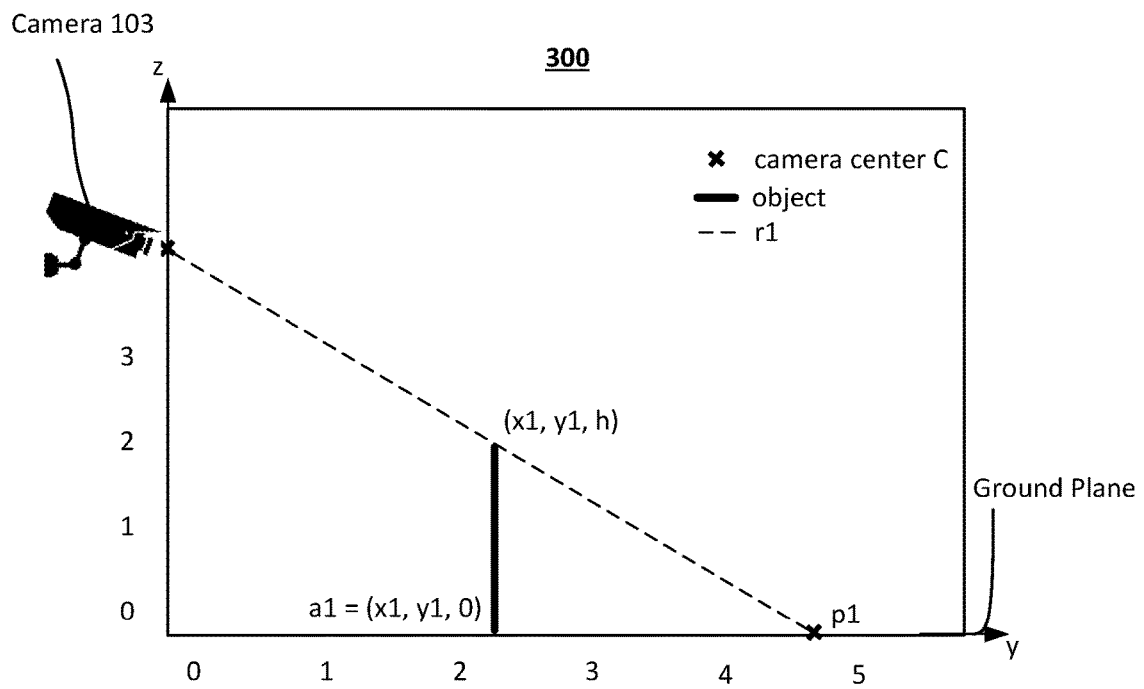
FIG. 3A is a graph of a z-axis distance metric versus an y-axis distance metric, in real world distances, of a first vector that intersects with a point on the object (in FIG. 1) and a ground plane.

Referring to FIG. 3A, for example, graph 300 includes a first vector that intersects with a point on the object and a ground plane. Graph 300 is captured along the y-z plane in the world plane of FIGS. 1A and 1B and depicts point $a_1$ and $p_1$. It should be noted that during the calibration phase height "h" of the object is known. Accordingly, the top-most point on the object is $(x_1, y_1, h)$.

Figure 1B:
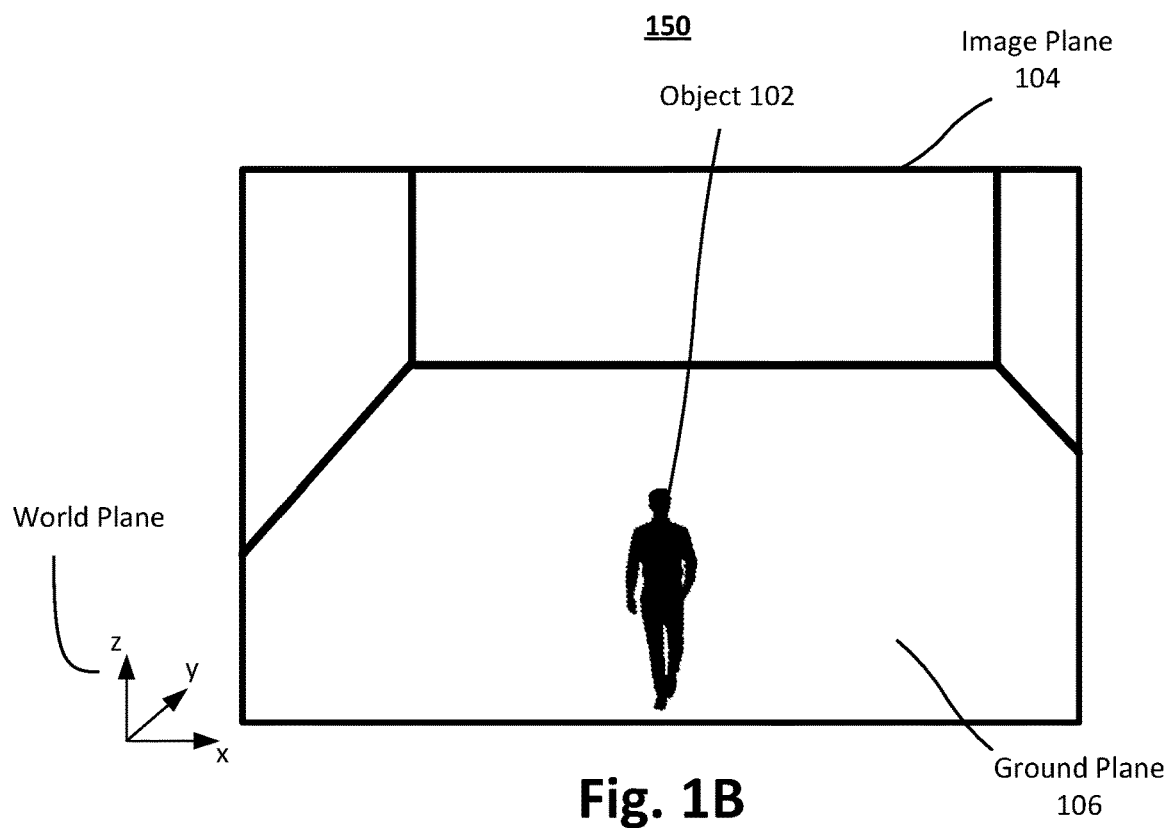
FIG. 1B is a second image of the object in a different position.

The calibration component may then obtain a second image from the camera 103. FIG. 1B is a second image 150 of the object 102 on a different location on the ground plane. Again, the calibration component determines two world points. The first world point is $a_2=(x_2, y_2, 0)$, which is the bottom-most point on the object. The second point is $p_2$, which is the intersection of the ground and a ray $r_2$ extending from the camera center to the top-most point of the object (e.g., the head of the person). In this case, the top-most point of the object is $(x_2, y_2, h)$. The calibration component then determines an intersection of $r_1$ and $r_2$, which serves as the camera center C in the world frame or world coordinate system (i.e., the height of the center of camera 103 in the real world relative to the ground plane) by estimating ray ry by extending from the point $p_1$ to $(x_1, y_1, h)$ and re by extending the point $p_2$ to $(x_2, y_2, h)$.

Suppose that $x_2=3$ ft, and $y_2=4$ ft. Accordingly, $a_2=(3, 4, 0)$. Suppose that the coordinates of $p_2$ are $(3, 8, 0)$. This suggests that the length difference along the y-axis between $a_2$ and $p_2$ is 4 feet. Suppose that the known height of the object is 6 feet. The point above $a_2$ is thus $(3, 4, 6)$. Given these two points, a first ray $r_2$ extending to camera 103 may be determined using the line equation $z=-1.5 y+12$. Suppose that $x_1=3$ ft, and $y_1=10$ ft. The coordinates of the point above $a_1$ is thus $(3, 10, 6)$. Suppose that the coordinates of $p_1$ are $(3, 20, 0)$. Given these two points, a second ray $r_1$ extending to camera 103 may be determined using the line equation $z=-0.6 y+12$. It should be noted that these are simplistic line equations in which it is assumed that the object simply moves in a straight line towards the camera and does not shift sideways. Both of these rays intersect at point C, which is given by $(0, 12)$. This suggests that the camera is fixed in a spot 12 ft above the ground plane.

Figure 3B:
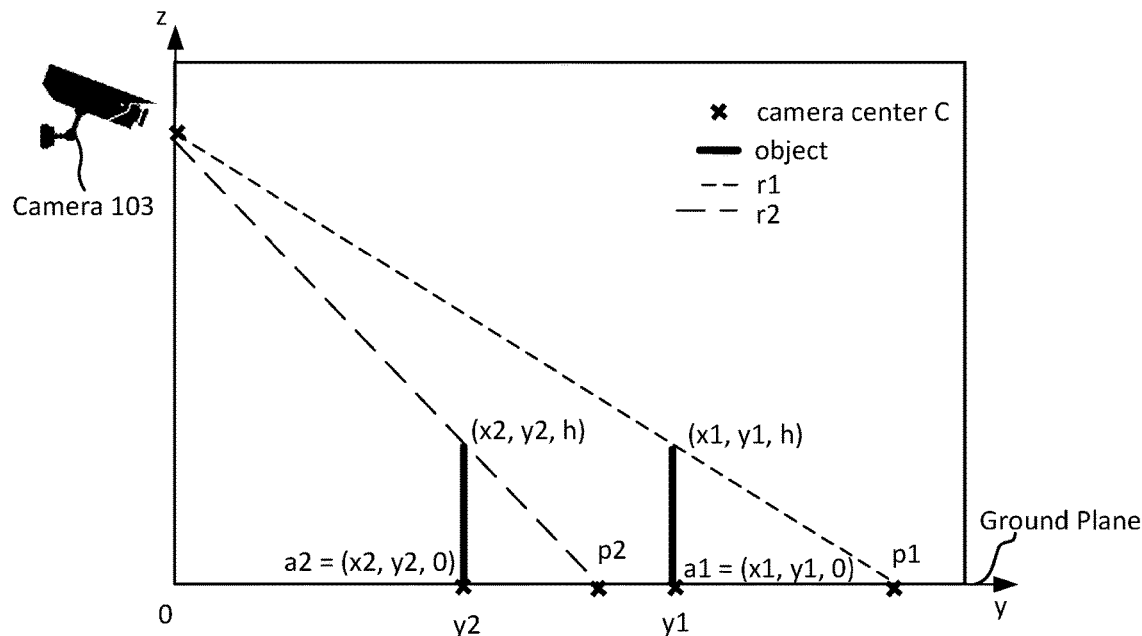
FIG. 3B is a graph of a z-axis distance metric versus an y-axis distance metric, in real world distances, of an intersection between the first vector (in FIG. 3A) and a second vector drawn based on the object at a different position.

Referring to FIG. 3B, for example, graph 350 includes an intersection between the first vector (i.e., $r_1$) and a second vector (i.e., $r_2$) drawn based on the object at a different position. The determination of C serves as the calibration of the camera 103.

Subsequently, when a new object with an unknown height is captured by the calibrated camera 103 in a single input image, the calibration component estimates a ground location $a_3=(x_3, y_3, 0)$ of the object using the homography matrix (e.g., converting the pixel location of the feet of a person to the real world location of the feet). The calibration component then finds, using the homography matrix H, an intersection $p_3$ between the ground plane and a ray $r_3$ that extends from point C to the top-most point of the object (e.g., the head of the person). The calibration component then estimates the height of the object given its position on the ground plane. For example, given the height of the camera, at least one point is known. Given $p_3$, there are two known points and a ray $r_3$ can be formed. If the y position of $a_3$ is then entered in the line equation of $r_3$, the value of h can be determined. For example, if $p_3$ is $(3, 7, 0)$ and the camera is positioned on $(3, 0, 12)$, the line equation is $z=-(12/7)y+12$. If $a_3$ is $(3, 3, 0)$, then $z=-(12/7)(3)+12=6.86$. This suggests that the height is approximately 6.86 of the arbitrary object.

On a high level, it should be noted that $r_3=p_3+\lambda(p_3-C)$. To find the height of the object, the calibration components finds $A_2$ for which $r_z=23$ (i.e., $\lambda_z=(z_3-p_z)/(p_z-C_z)$). The calibration component determines the height on the point where $\lambda=\lambda_z$. More specifically, height=$C_z((z_3-p_z)/(C_z-p_z))$.

Figure 4:
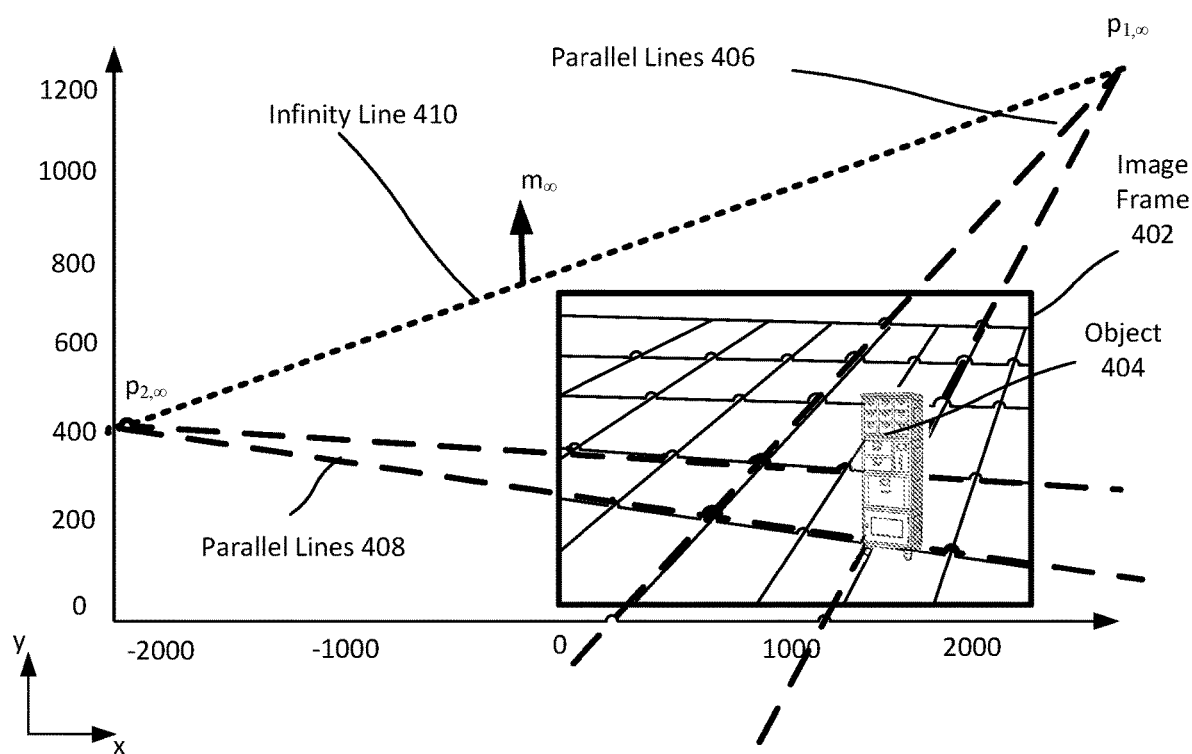
FIG. 4 is an image of an object on a surface with parallel lines as captured by a camera to be calibrated, and as projected onto a graph of a z-axis distance metric versus an y-axis distance metric, in real world distances.

Referring to FIG. 4, in an example of the second approach for calibration and subsequent measurement using parallel lines on the ground in an image, along with a camera focal length and an object of known height in the image, a graph 400 including an image frame 402 having an image of object 404 (e.g., a cabinet) on a surface with parallel lines is captured by a camera 103 to be calibrated. It should be noted that parallel lines 408 and parallel lines 406 are parallel in the real world. However, due to factors such as the curvature/shape of the lens of the camera 103 and the angle at which the camera 103 is positioned, parallel lines in the real world appear angled in the image. For example, in graph 400 and image frame 402, parallel lines 406 are angled inward such that they would intersect from the perspective of the camera 103. Likewise, parallel lines 408 are angled inward such that they too would intersect.

Given two sets of parallel lines (e.g., parallel lines 408 and parallel lines 406), wherein one set intersects with the other set (e.g., are perpendicular or cross at an angle), a camera focal length f, and an image of an object with a known height $l_0$, the calibration component can calibrate the camera 103 and estimate the heights of arbitrary objects. More specifically, the calibration component determines an intersection point at $\infty$ of parallel lines 406, namely, $p_{1, \infty}$, and the intersection point of parallel lines 408, namely, $p_{2, \infty}$. It should be noted that points $p_{1, \infty}$ and $p_{1, \infty}$ extend beyond image frame 202. The calibration component may generate a graph where each pixel of image frame 402 represents a unit on the graph (as shown in FIG. 4). In some aspects, the bottom left pixel of image frame 402 serves as the origin point of the graph $(0,0)$. The graph may extend as far as needed depending on where the parallel lines intersect.

The calibration component then determines the projection of the ground line at $\infty$, namely, infinity line 410 (used interchangeably with $l_{g,\infty}$ and ground line 510). Using the focal length f of the camera 103 and the image size in pixels of image frame 402, the calibration component determines an internal camera matrix K. The calibration component then uses K and infinity line 410 to find any point at infinity, $m_\infty$, on any line perpendicular to the ground line. The determination of $m_\infty$ serves as the calibration of the camera 103.

Figure 5:
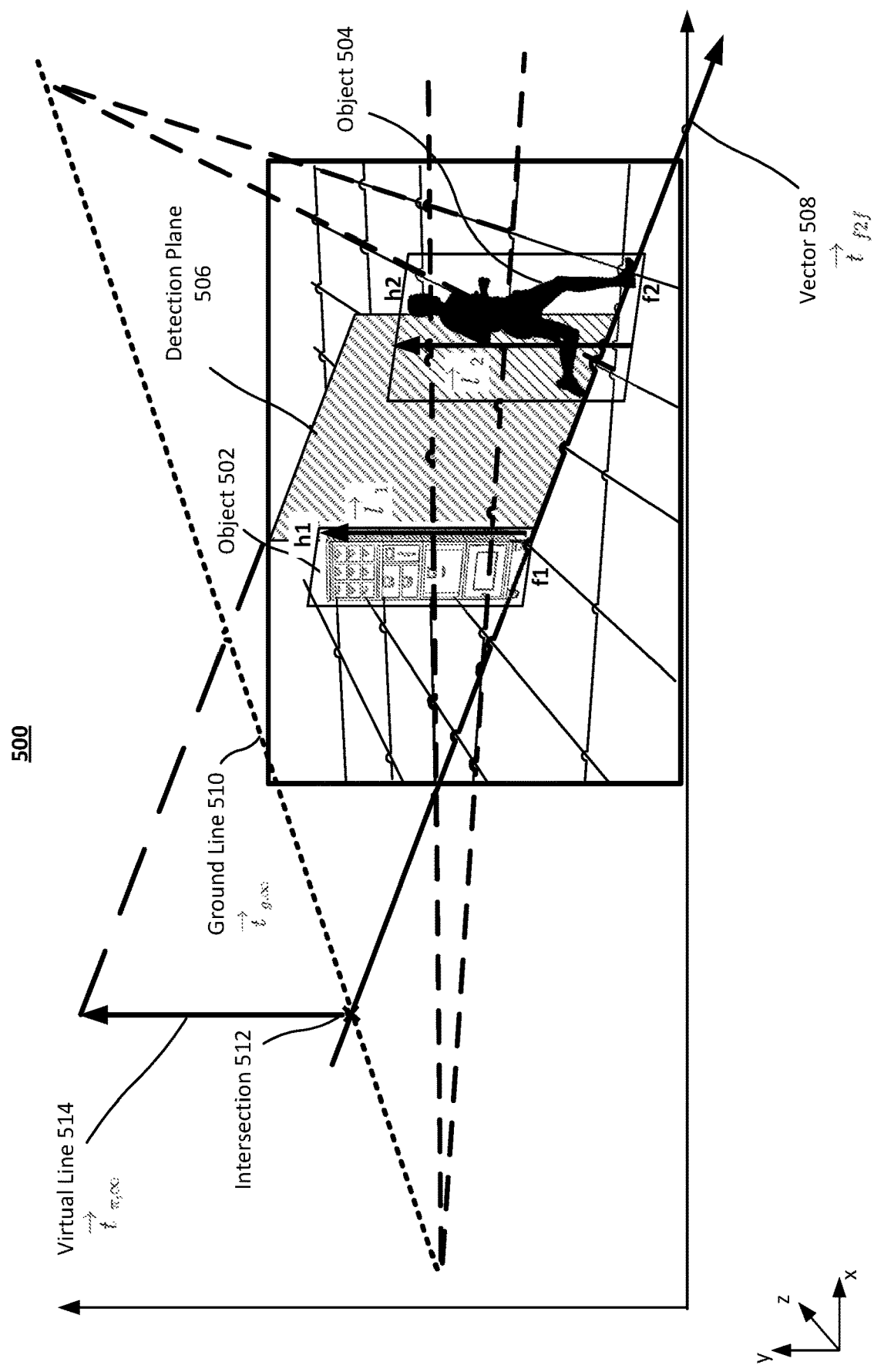
FIG. 5 is a diagram of a detection plane associated with the camera calibrated based on the image of FIG. 4.

Referring to FIG. 5, diagram 500 includes a detection plane 506 associated with the camera 103 calibrated based on the graph 400 and image frame 402 of FIG. 4. In diagram 500, the height of object 502 is known and the calibration component determines the unknown height of object 504 using the calibrated camera 103. In particular, when a new object enters a scene in an image frame captured by camera 103, the calibration component determines the intersection py (intersection 512) of (A) the line connecting the bottom-most point of the new object (e.g., the feet of object 504) and the bottom-most point of the known object (e.g., the feet of object 502) and (B) ground line 510 (e.g., infinity line 410 from FIG. 4). In this case, object 502 is a stationary object that is used as reference for comparison with other objects.

The calibration component further calculates a virtual line 514 at intersection 512. Virtual line 514 is perpendicular to ground line 510 and passes through intersection 512. From virtual line 514, the calibration component determines detection plane 506, which is a plane including at least one point on each of the two objects and virtual line 514. As shown in FIG. 5, which shows detection plane 506 partially shaded (particularly where the two objects are located). It should be noted that detection plane 506 extends to encompass virtual line 514. The calibration component determines the homography matrix that transform virtual line 514 to its canonical form $(0, 0, 1)^T$ and uses the homography matrix to rectify the top-most and bottom-most points of the objects 502 and 504. For example, the calibration component uses the feet and head points of the persons in diagram 500 (e.g., $f_i$, $h_i$, i=1, 2, respectively). The calibration component then calculates the rectified heights $l_{r,i}=|h_i-f_i|$, where the height of object 504 is given by $l_0 (l_{r,1})/h_{r,2}$.

To better explain this calculation, consider the following example:

In FIG. 5, suppose that ground line 510 is represented by $\vec{t}_{g,\infty}$ and is given by $\vec{t}_{g,\infty}=(3/9, 1, -320)$. Suppose that vector 508 is represented by $\vec{t}_{p2f}$ connecting the feet of object 504 with the feet of object 502, and is given by $\vec{t}_{p2f}=(-0.38, 1, 147)$. Intersection 512 is the intersection of $\vec{t}_{g,\infty}$ and $\vec{t}_{p2f}$, and is given by $\vec{t}_{p2f} \times \vec{t}_{g,\infty}=(243, 239, 1)$. This point is the first point on the line at infinity of detection plane 506 (e.g., plane II). Suppose that the two lines $\vec{l}_1$ and $\vec{l}_2$ are given by $l_1=(78.5, 1, -54903)$ and $l_2=(-71, 1, 37420)$. These two lines intersect at the point $\vec{m}_\infty$ (not shown in the figure) given by $\vec{m}_\infty=(617, 642, 1)$. Virtual line 514 is represented by $\vec{t}_{\pi,\infty}$ and is the line between intersection 512 and $\vec{m}_\infty$ and is given by $\vec{t}_{\pi,\infty}=(-4.4e-3, 2.6e-4, 1)$. The homography matrix H that rectifies this line by to the form (0, 0, 1) is given by $$H = \begin{matrix} 1 & 0 & 0 \\ 0 & 1 & 0 \\ -6186 & 375 & 1413583 \end{matrix}.$$

Calibration component 615 uses H to rectify the head and feet points of object 502 and 504. The rectified head and feet points of object 504 are $h_2=(-2.5c-4, -9.60-5, 1)$, $f_2=(-2.6e-4, -1.6e-4, 1)$ and the rectified head and feet points of object 502 are $h_1=(-3e-4, -1.2c-4, 1)$, $f_1=(-3e-4, -2e-4, 1)$. After the projective rectification, the length ratios are the conserved. Accordingly, if the object 502 height (e.g., $h_{object}$) is known to be 2 meters, then:

$$\frac{|h_1 - f_1|}{|h_2 - f_2|} = \frac{2}{h_{person}} \Rightarrow h_{person} = \frac{|h_2 - f_2|}{|h_1 - f_1|} * 2 = 0.1 * 2 = 0.2 \text{ m}.$$

Figure 6:
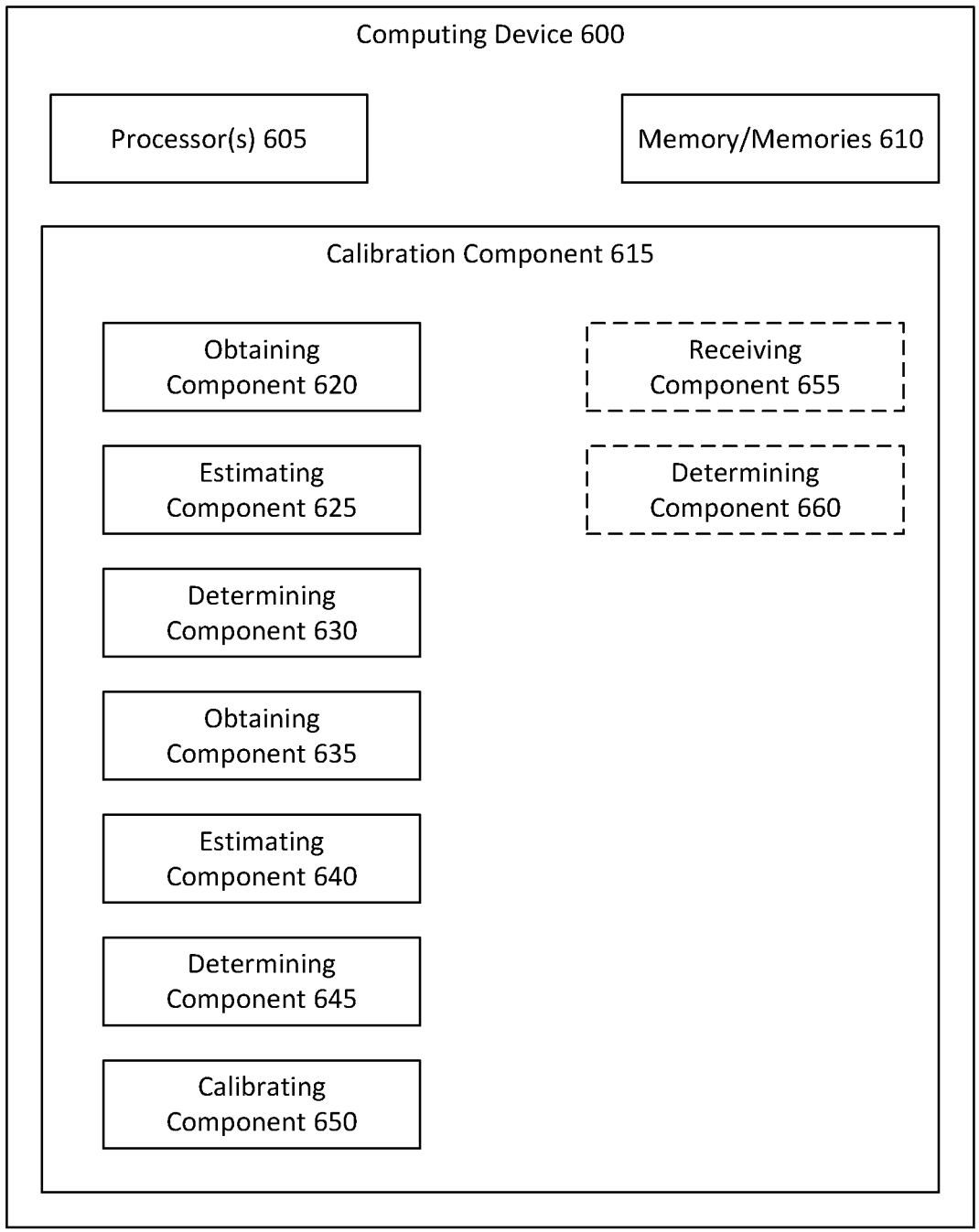
FIG. 6 is a block diagram of an example of a computer device having components configured to perform a method for estimating a real world distance in an image.
Figure 7:
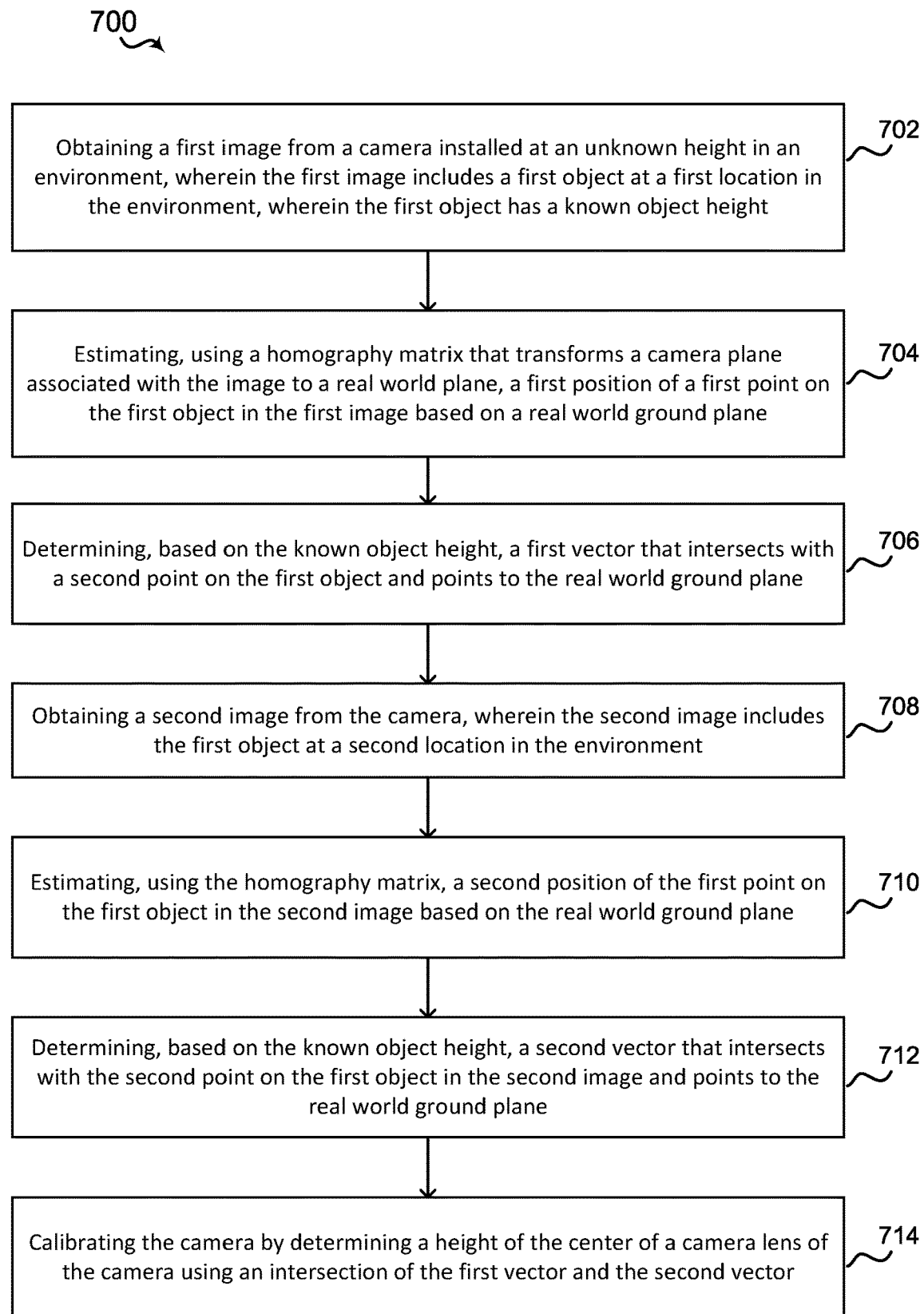
FIG. 7 is a flowchart of an example of a method for estimating a real world distance in an image.

Referring to FIG. 6 and FIG. 7, in operation, computing device 600 may perform a method 700 of estimating a real world height/size in an image, by such as via execution of calibration component 615 by processor(s) 605 and/or one or more memories 610. For example, method 700 and computing device 900 relate to the first approach that includes using image to ground homography and two images of an object of known size to calibrate the camera 103, which can then be used to estimate real world heights and sizes in an image.

At block 702, the method 700 includes obtaining a first image from a camera installed at an unknown height in an environment, wherein the first image includes a first object at a first location in the environment, wherein the first object has a known object height. For example, in an aspect, computing device 600, processor(s) 605, one or more memories 610, calibration component 615, and/or obtaining component 620 may be configured to or may comprise means for obtaining a first image (e.g., image 100) from a camera 103 installed at an unknown height in an environment, wherein the first image includes a first object (e.g., object 102) at a first location in the environment, wherein the first object has a known object height (e.g., 6 feet). In some aspects, calibration component 615 identifies the first object by detecting (e.g., using a person detection classifier) an object bounding box around the first object.

At block 704, the method 700 includes estimating, using a homography matrix that transforms an image plane associated with the image to a real world plane, a first position of a first point on the first object in the first image based on a real world ground plane. For example, in an aspect, computing device 600, processor(s) 605, one or more memories 610, calibration component 615, and/or estimating component 625 may be configured to or may comprise means for estimating, using a homography matrix that transforms an image plane (e.g., image plane 104) associated with the image (e.g., image 100) to a real world plane, a first position (e.g., $a_1=(x_1, y_1, 0)$) of a first point (e.g., the fect) on the first object in the first image based on a real world ground plane (e.g., ground plane 106).

At block 706, the method 700 includes determining, based on the known object height, a first vector that intersects with a second point on the first object and points to the real world ground plane. For example, in an aspect, computing device 600, processor(s) 605, one or more memories 610, calibration component 615, and/or determining component 630 may be configured to or may comprise means for determining, based on the known object height, a first vector (e.g., $r_1$) that intersects with a second point on the first object (e.g., the head of a person) and points to the real world ground plane (e.g., intersecting at $p_1$).

At block 708, the method 700 includes obtaining a second image from the camera, wherein the second image includes the first object at a second location in the environment. In some aspects, the first object in the second image is also bound by an object bounding box, which is detected by calibration component 615. For example, in an aspect, computing device 600, processor(s) 605, one or more memories 610, calibration component 615, and/or obtaining component 635 may be configured to or may comprise means for obtaining a second image from the camera 103, wherein the second image includes the first object (e.g., object 102) at a second location in the environment.

At block 710, the method 700 includes estimating, using the homography matrix, a second position of the first point on the first object in the second image based on the real world ground plane. For example, in an aspect, computing device 600, processor(s) 605, one or more memories 610, calibration component 615, and/or estimating component 640 may be configured to or may comprise means for estimating, using the homography matrix, a second position (e.g., $a_2=(x_2, y_2, 0)$) of the first point (e.g., the fect) on the first object in the second image based on the real world ground plane (e.g., ground plane 106).

At block 712, the method 700 includes determining, based on the known object height, a second vector that intersects with the second point on the first object in the second image and points to the real world ground plane. For example, in an aspect, computing device 600, processor(s) 605, one or more memories 610, calibration component 615, and/or determining component 645 may be configured to or may comprise means for determining, based on the known object height, a second vector (e.g., $r_2$) that intersects with the second point (e.g., the head) on the first object in the second image and points to the real world ground plane.

At block 714, the method 700 includes calibrating the camera by determining a height of the center of a camera lens of the camera using an intersection of the first vector and the second vector. For example, in an aspect, computing device 600, processor(s) 605, one or more memories 610, calibration component 615, and/or calibrating component 650 may be configured to or may comprise means for calibrating the camera 103 by determining a height of the center of a camera lens of camera 103 (e.g., C) using an intersection of the first vector (e.g., $r_1$) and the second vector (e.g., $r_2$). In some aspects, the exact three-dimensional location of the camera lens center is determined. This location includes the height and lateral position of the camera lens center.

In an alternative or additional aspect, the second point on the first object has a known second point height based on the known object height.

In an alternative or additional aspect, the first point is associated with a base of the first object (e.g., the bottom-most point), and the second point is associated with a top of the first object (e.g., the top-most point).

In an alternative or additional aspect, the first object is a person, the first point is associated with a foot of the person, and the second point is associated with a head of the person.

Figure 8:
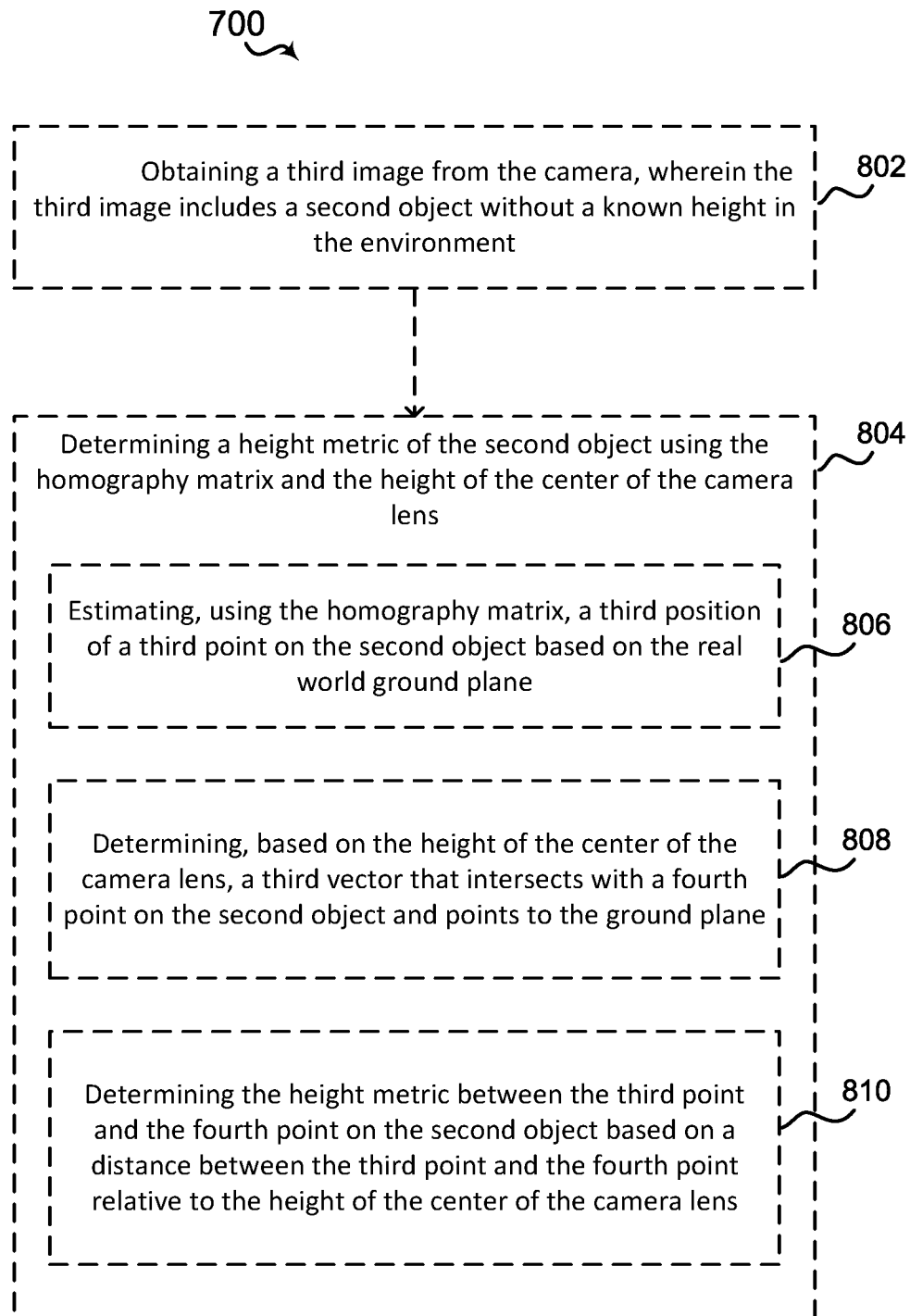
FIG. 8 is a flowchart of additional aspects of the method of FIG. 7.

Referring to FIG. 8, in an alternative or additional aspect, at block 802, the method 700 may further include receiving a third image from the camera, wherein the third image includes a second object without a known height in the environment. For example, in an aspect, computing device 600, processor(s) 605, one or more memories 610, calibration component 615, and/or obtaining component 655 may be configured to or may comprise means for obtaining a third image from the camera 103, wherein the third image includes a second object without a known height in the environment. For example, the third image may be similar to image 100, but the object in the third image may be different from object 102. It should be noted that although image 100 includes a person as the object used to calibrate the camera 103, once the camera 103 is calibrated, the object may be any item, person, animal, etc. The object may be animate or inanimate and does not need to be the same type of object used to calibrate the camera 103. The object in the third image can also be in any location of the environment as long as the base of the object and the top of the object is visible in the third image—to calculate the size (e.g., height) of the object.

In this optional aspect, at block 804, the method 700 may further include determining a height metric of the second object using the homography matrix and the height of the center of the camera lens. For example, in an aspect, computing device 600, processor(s) 605, one or more memories 610, calibration component 615, and/or determining component 660 may be configured to or may comprise means for determining a height metric of the second object using the homography matrix and the height of the center of the camera lens of camera 103 (e.g., C).

In this optional aspect, at block 806, the determining at block 804 of the height metric of the second object comprises estimating, using the homography matrix, a third position (e.g., $a_3=(x_3, y_3, 0)$) of a third point (e.g., the feet) on the second object based on the real world ground plane (e.g., ground plane 106).

In this optional aspect, at block 808, the determining at block 804 of the height metric of the second object comprises determining, based on the height of the center of the camera lens, a third vector (e.g., $r_3$) that intersects with a fourth point (e.g. the head) on the second object and points to the ground plane (e.g., intersecting at $p_3$).

In this optional aspect, at block 810, the determining at block 804 of the height metric of the second object comprises determining the height metric between the third point and the fourth point on the second object based on a distance between the third point and the fourth point relative to the height of the center of the camera lens of camera 103 (e.g., C).

For example, calibration component 615 may calculate the height as equal to $C_x ((x_3-p_x)/(C_x-p_x))$, as discussed previously.

In an alternative or additional aspect, the third point is associated with a base of the second object, and the fourth point is associated with a top of the second object.

Figure 9:
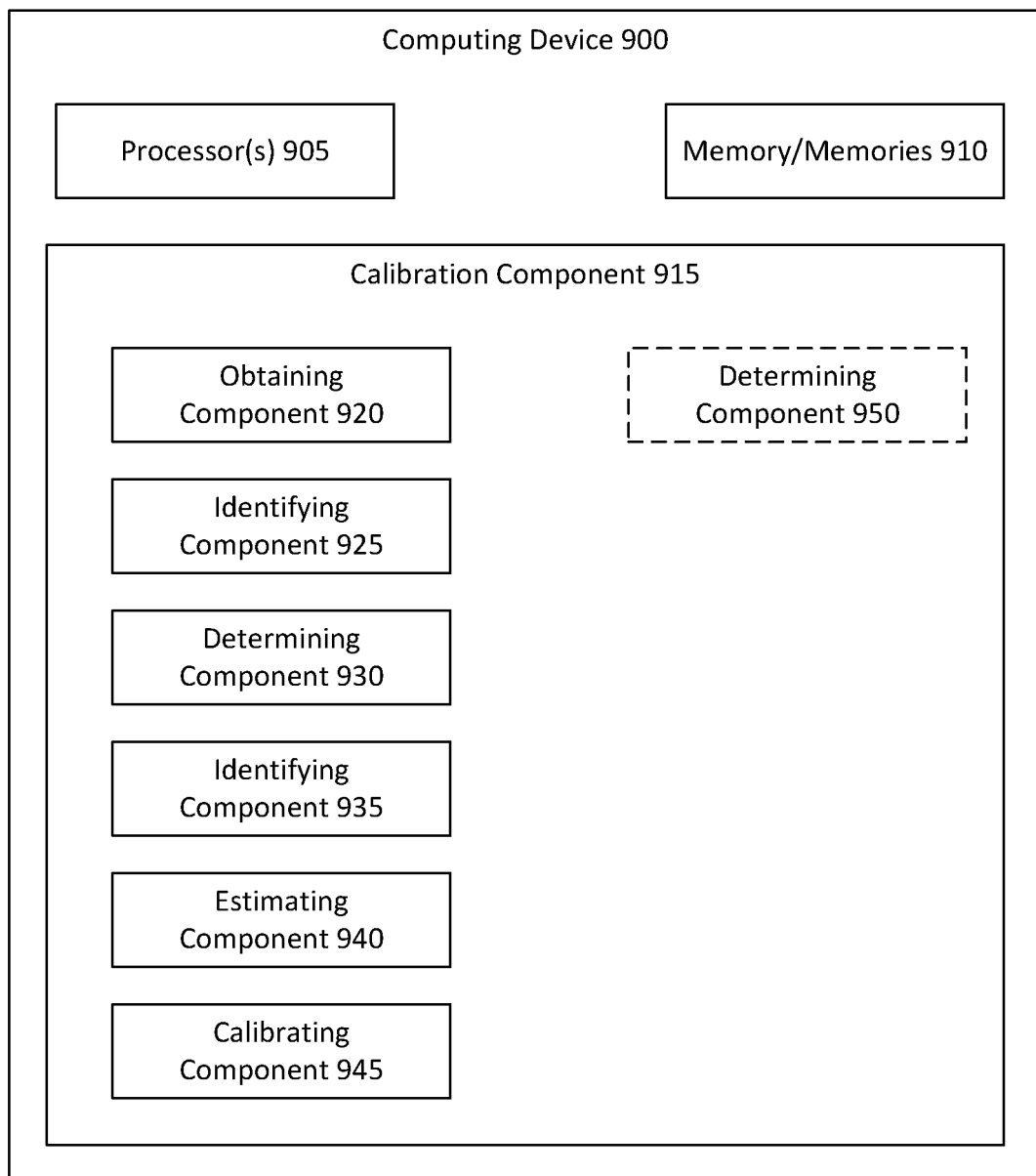
FIG. 9 is a block diagram of an example of a computer device having components configured to perform a method for estimating a real world distance in an image.
Figure 10:
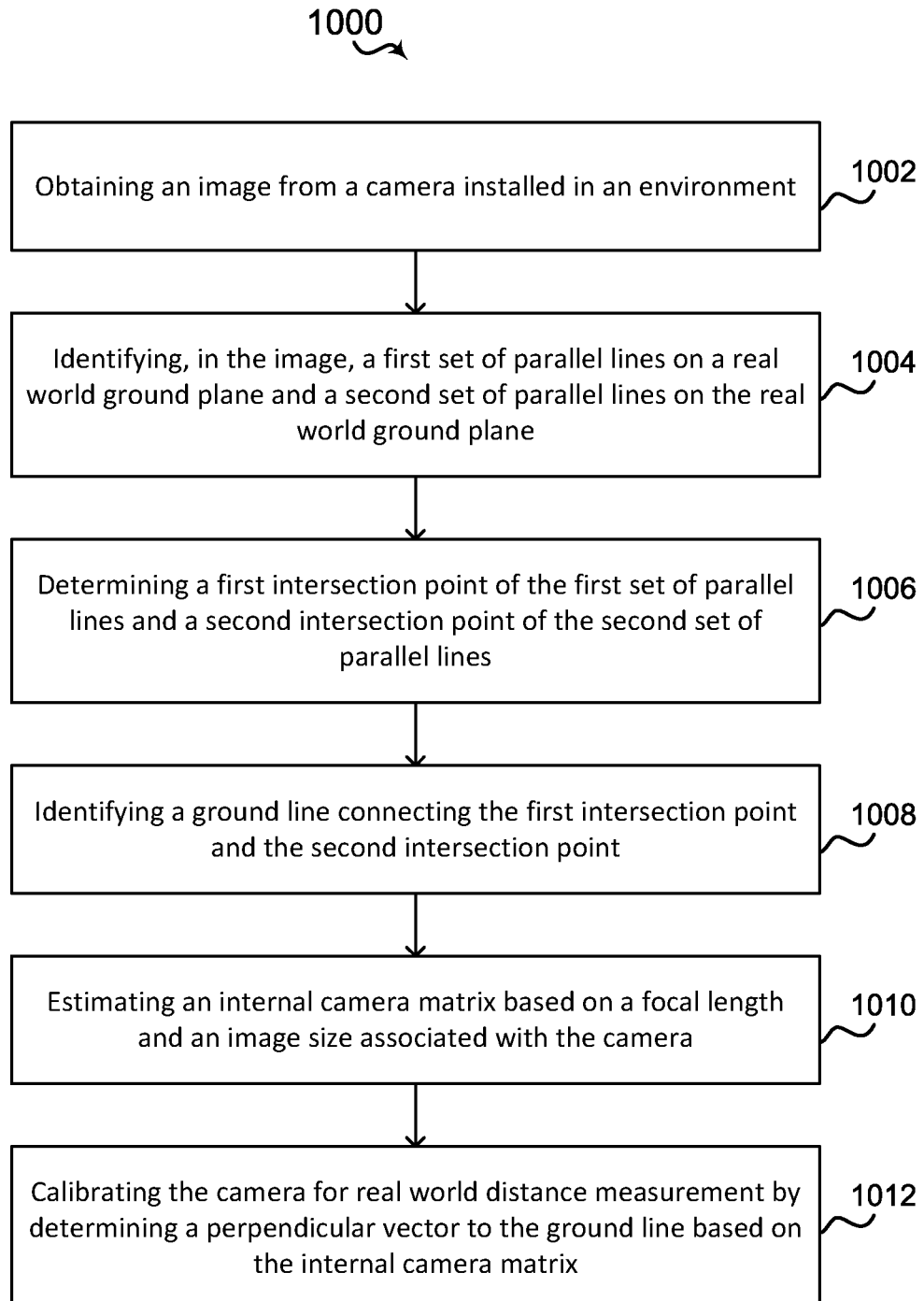
FIG. 10 is a flowchart of an example of a method for estimating a real world distance in an image.

Referring to FIG. 9 and FIG. 10, in operation, computing device 900 may perform a method 1000 of estimating a real world distance in an image, by such as via execution of calibration component 915 by processor(s) 905 and/or one or more memories 910. For example, method 700 and computing device 900 relate to the second approach for calibration and subsequent measurement using parallel lines on the ground in an image, along with a camera focal length and an object of known height in the image.

At block 1002, the method 1000 includes obtaining an image from a camera installed in an environment. For example, in an aspect, computing device 900, processor(s) 905, one or more memories 910, calibration component 915, and/or obtaining component 920 may be configured to or may comprise means for obtaining an image (e.g., image frame 402) from a camera 103 installed in an environment.

At block 1004, the method 1000 includes identifying, in the image, a first set of parallel lines on a real world ground plane and a second set of parallel lines on the real world ground plane. For example, in an aspect, computing device 900, processor(s) 905, one or more memories 910, calibration component 915, and/or identifying component 925 may be configured to or may comprise means for identifying, in the image, a first set of parallel lines (e.g., parallel lines 406) on a real world ground plane and a second set of parallel lines (e.g., parallel lines 408) on the real world ground plane.

At block 1006, the method 1000 includes determining a first intersection point of the first set of parallel lines and a second intersection point of the second set of parallel lines. For example, in an aspect, computing device 900, processor(s) 905, one or more memories 910, calibration component 915, and/or determining component 930 may be configured to or may comprise means for determining a first intersection point (e.g., $p_{1,\infty}$) of the first set of parallel lines and a second intersection point of the second set of parallel lines (e.g., $p_{2,\infty}$).

At block 1008, the method 1000 includes identifying a ground line connecting the first intersection point and the second intersection point. For example, in an aspect, computing device 900, processor(s) 905, one or more memories 910, calibration component 915, and/or identifying component 935 may be configured to or may comprise means for identifying a ground line (e.g., infinity line 410) connecting the first intersection point and the second intersection point.

At block 1010, the method 1000 includes estimating an internal camera matrix based on a focal length and an image size associated with the camera. For example, in an aspect, computing device 900, processor(s) 905, one or more memories 910, calibration component 915, and/or estimating component 940 may be configured to or may comprise means for estimating an internal camera matrix (e.g., K) based on a focal length (e.g., f) and an image size (e.g., of image frame 402) associated with the camera 103.

At block 1012, the method 1000 includes calibrating the camera for real world distance measurement by determining a perpendicular vector to the ground line based on the internal camera matrix. For example, in an aspect, computing device 900, processor(s) 905, one or more memories 910, calibration component 915, and/or calibrating component 945 may be configured to or may comprise means for calibrating the camera 103 for real world distance measurement by determining a perpendicular vector (e.g., $m_\infty$) to the ground line based on the internal camera matrix.

Figure 11:
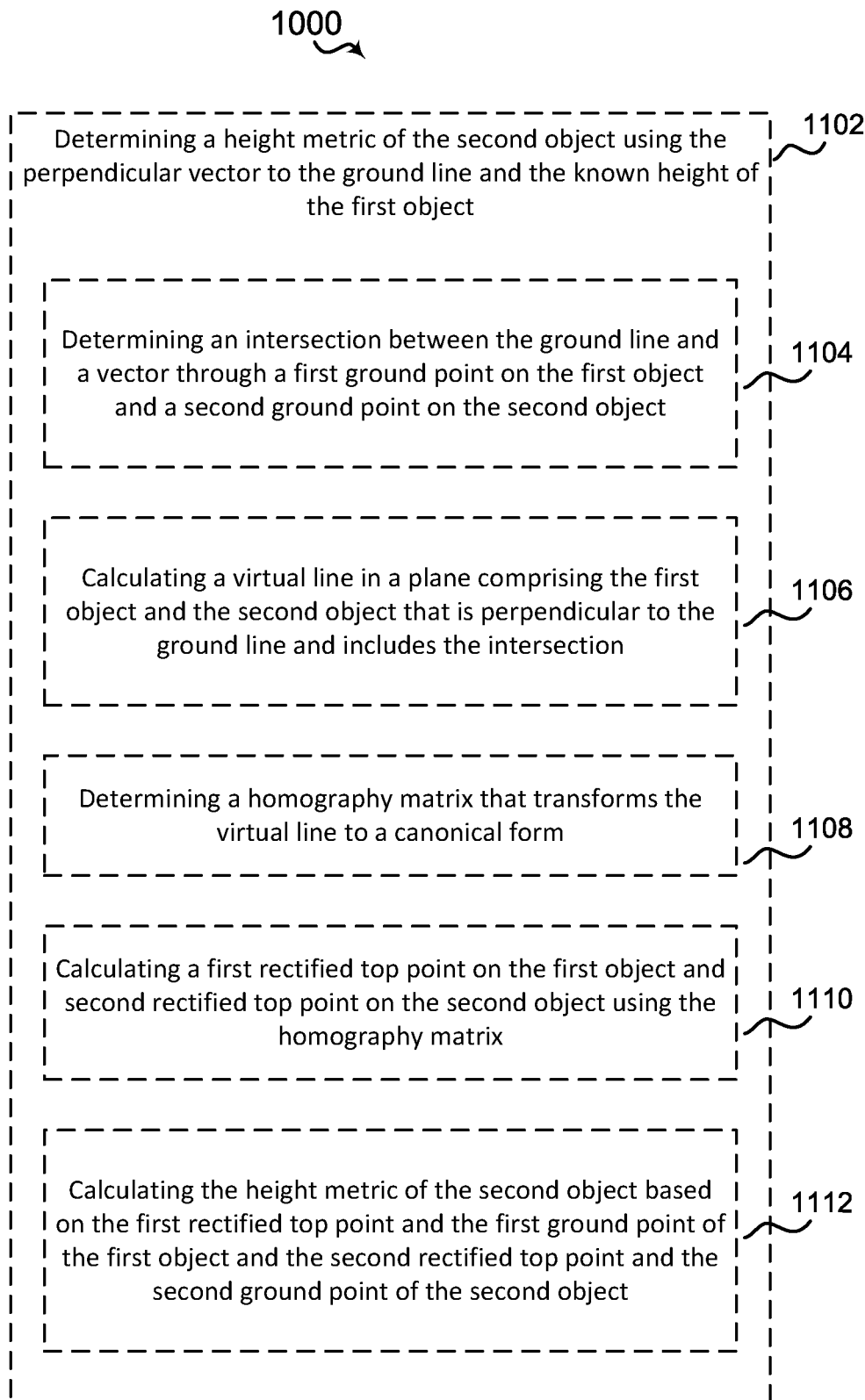
FIG. 11 is a flowchart of additional aspects of the method of FIG. 10.

Referring to FIG. 11, in an alternative or additional aspect wherein the image or a subsequent image from the camera of the environment includes a first object having a known height and a second object having an unknown height, at block 1102, the method 1000 may further include determining a height metric of the second object using the perpendicular vector to the ground line and the known height of the first object. For example, in an aspect, computing device 900, processor(s) 905, one or more memories 910, calibration component 915, and/or determining component 950 may be configured to or may comprise means for determining a height metric of the second object (e.g., object 504) using the perpendicular vector (e.g., $m_\infty$) to the ground line (e.g., infinity line 410) and the known height of the first object (e.g., object 502).

In this optional aspect, at block 1104, the determining at block 1102 of the height metric of the second object comprises determining an intersection between the ground line (e.g., infinity line 410) and a vector (e.g., vector 508) through a first ground point on the first object and a second ground point on the second object.

In this optional aspect, at block 1106, the determining at block 1102 of the height metric of the second object comprises calculating a virtual line (e.g., virtual line 514) in a plane (e.g., detection plane 506) that comprises the first object (e.g., object 502) and the second object (e.g., object 504) that is perpendicular to the ground line (e.g., ground line 510) and includes the intersection (e.g., intersection 512).

In this optional aspect, at block 1108, the determining at block 1102 of the height metric of the second object comprises determining a homography matrix that transforms the virtual line to a canonical form. For example, calibration component 915 determines the homography matrix that transforms virtual line 514 to its canonical form. For example, given the coordinates of the point $A(x_0, y_0)$ and the coordinates of the point n={l; m}, the equation of the line can be written in the canonical form using the following formula:

$$\frac{x - x0}{l} = \frac{y - y0}{m}$$

In this optional aspect, at block 1110, the determining at block 1102 of the height metric of the second object comprises calculating a first rectified top point on the first object and second rectified top point on the second object using the homography matrix. For example, calibration component 915 uses the feet and head points of the persons in diagram 500 (e.g., $f_i$, $h_i$, i=1, 2, respectively).

In this optional aspect, at block 1112, the determining at block 1102 of the height metric of the second object comprises calculating the height metric of the second object based on the first rectified top point and the first ground point of the first object and the second rectified top point and the second ground point of the second object. Calibration component 915 then calculates the rectified heights $l_{r,i}=|h_i-f_i|$, where the height of object 504 is given by $l_0(l_{r,1})/h_{r,2}$. Here, the height $l_0$ is known.

The following clauses include additional implementations of the present disclosure.

Clause 1. A method for estimating a real world distance in an image, comprising: obtaining a first image from a camera installed at an unknown height in an environment, wherein the first image includes a first object at a first location in the environment, wherein the first object has a known object height; estimating, using a homography matrix that transforms an image plane associated with the image to a real world plane, a first position of a first point on the first object in the first image based on a real world ground plane; determining, based on the known object height, a first vector that intersects with a second point on the first object and points to the real world ground plane; obtaining a second image from the camera, wherein the second image includes the first object at a second location in the environment; estimating, using the homography matrix, a second position of the first point on the first object in the second image based on the real world ground plane; determining, based on the known object height, a second vector that intersects with the second point on the first object in the second image and points to the real world ground plane; and calibrating the camera by determining a height of the center of a camera lens of the camera using an intersection of the first vector and the second vector.

Clause 2. The method of clause 1, wherein the second point on the first object has a known second point height based on the known object height.

Clause 3. The method of any one or any combination of the preceding clauses, wherein the first point is associated with a base of the first object, and the second point is associated with a top of the first object.

Clause 4. The method of any one or any combination of the preceding clauses, wherein the first object is a person, the first point is associated with a foot of the person, and the second point is associated with a head of the person.

Clause 5. The method of any one or any combination of the preceding clauses, further comprising: obtaining a third image from the camera, wherein the third image includes a second object without a known height in the environment;

and determining a height metric of the second object using the homography matrix and the height of the center of the camera lens of the camera.

Clause 6. The method of any one or any combination of the preceding clauses, wherein determining the height metric of the second object comprises: estimating, using the homography matrix, a third position of a third point on the second object based on the real world ground plane; determining, based on the height of the center of the camera lens, a third vector that intersects with a fourth point on the second object and points to the ground plane; and determining the height metric between the third point and the fourth point on the second object based on a distance between the third point and the fourth point relative to the height of the center of the camera lens of the camera.

Clause 7. The method of any one or any combination of the preceding clauses, wherein the third point is associated with a base of the second object, and the fourth point is associated with a top of the second object.

Clause 8. An apparatus for estimating a real world distance in an image, comprising: a memory; and a processor coupled with the memory and configured to: obtain a first image from a camera installed at an unknown height in an environment, wherein the first image includes a first object at a first location in the environment, wherein the first object has a known object height; estimate, using a homography matrix that transforms an image plane associated with the image to a real world plane, a first position of a first point on the first object in the first image based on a real world ground plane; determine, based on the known object height, a first vector that intersects with a second point on the first object and points to the real world ground plane; obtain a second image from the camera, wherein the second image includes the first object at a second location in the environment; estimate, using the homography matrix, a second position of the first point on the first object in the second image based on the real world ground plane; determine, based on the known object height, a second vector that intersects with the second point on the first object in the second image and points to the real world ground plane; and calibrate the camera by determining a height of the center of a camera lens of the camera using an intersection of the first vector and the second vector.

Clause 9. The apparatus of clause 8, wherein the second point on the first object has a known second point height based on the known object height.

Clause 10. The apparatus of any one or any combination of the preceding clauses, wherein the first point is associated with a base of the first object, and the second point is associated with a top of the first object.

Clause 11. The apparatus of any one or any combination of the preceding clauses, wherein the first object is a person, the first point is associated with a foot of the person, and the second point is associated with a head of the person.

Clause 12. The apparatus of any one or any combination of the preceding clauses, wherein the one or more processors individually or in combination are further configured to: obtain a third image from the camera, wherein the third image includes a second object without a known height in the environment; and determine a height metric of the second object using the homography matrix and the height of the center of the camera lens.

Clause 13. The apparatus of any one or any combination of the preceding clauses, wherein to determine the height metric of the second object comprises to: estimate, using the homography matrix, a third position of a third point on the second object based on the real world ground plane; determine, based on the height of the center of the camera lens, a third vector that intersects with a fourth point on the second object and points to the ground plane; and determine the height metric between the third point and the fourth point on the second object based on a distance between the third point and the fourth point relative to the height of the center of the camera lens.

Clause 14. The apparatus of any one or any combination of the preceding clauses, wherein the third point is associated with a base of the second object, and the fourth point is associated with a top of the second object.

Clause 15. A method for estimating a real world distance in an image, comprising: obtaining an image from a camera installed in an environment; identifying, in the image, a first set of parallel lines on a real world ground plane and a second set of parallel lines on the real world ground plane; determining a first intersection point of the first set of parallel lines and a second intersection point of the second set of parallel lines; identifying a ground line connecting the first intersection point and the second intersection point; estimating an internal camera matrix based on a focal length and an image size associated with the camera; and calibrating the camera for real world distance measurement by determining a perpendicular vector to the ground line based on the internal camera matrix.

Clause 16. The method of clause 15, wherein the image or a subsequent image from the camera of the environment includes a first object having a known height and a second object having an unknown height, further comprising: determining a height metric of the second object using the perpendicular vector to the ground line and the known height of the first object.

Clause 17. The method of any one or any combination of the preceding clauses, wherein determining the height metric of the second object comprises: determining an intersection between the ground line and a vector through a first ground point on the first object and a second ground point on the second object; calculating a virtual line in a plane comprising the first object and the second object that is perpendicular to the ground line and includes the intersection; determining a homography matrix that transforms the virtual line to a canonical form; calculating a first rectified top point on the first object and second rectified top point on the second object using the homography matrix; and calculating the height metric of the second object based on the first rectified top point and the first ground point of the first object and the second rectified top point and the second ground point of the second object.

Clause 18. An apparatus for estimating a real world distance in an image, comprising: a memory; and a processor coupled with the memory and configured to: obtain an image from a camera installed in an environment; identify, in the image, a first set of parallel lines on a real world ground plane and a second set of parallel lines on the real world ground plane; determine a first intersection point of the first set of parallel lines and a second intersection point of the second set of parallel lines; identify a ground line connecting the first intersection point and the second intersection point; estimate an internal camera matrix based on a focal length and an image size associated with the camera; and calibrate the camera for real world distance measurement by determining a perpendicular vector to the ground line based on the internal camera matrix.

Clause 19. The apparatus of clause 18, wherein the image or a subsequent image from the camera of the environment includes a first object having a known height and a second object having an unknown height, wherein the one or more processors individually or in combination are further configured to: determine a height metric of the second object using the perpendicular vector to the ground line and the known height of the first object.

Clause 20. The apparatus of any one or any combination of the preceding clauses, wherein to determine the height metric of the second object comprises to: determine an intersection between the ground line and a vector through a first ground point on the first object and a second ground point on the second object; calculate a virtual line in a plane comprising the first object and the second object that is perpendicular to the ground line and includes the intersection; determine a homography matrix that transforms the virtual line to a canonical form; calculate a first rectified top point on the first object and second rectified top point on the second object using the homography matrix; and calculate the height metric of the second object based on the first rectified top point and the first ground point of the first object and the second rectified top point and the second ground point of the second object.

Clause 21. The apparatus of any one or any combination of the preceding clauses, wherein the height metric of the second object is proportional to the known height of the first object.

Clause 22. The apparatus of any one or any combination of the preceding clauses, wherein the first object is a stationary object in the environment.

Clause 23. The apparatus of any one or any combination of the preceding clauses, wherein the first set of parallel lines intersect with the second set of parallel lines.

Clause 24. The apparatus of any one or any combination of the preceding clauses, wherein the first set of parallel lines are perpendicular to the second set of parallel lines in the real world ground plane.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for estimating a real world distance in an image, comprising:
 obtaining an image from a camera installed in an environment;
 identifying, in the image, a first set of parallel lines on a real world ground plane and a second set of parallel lines on the real world ground plane;
 determining a first intersection point of the first set of parallel lines mapped on an image plane and a second intersection point of the second set of parallel lines mapped on the image plane;
 identifying a ground line connecting the first intersection point and the second intersection point;
 estimating an internal camera matrix based on a focal length and an image size associated with the camera; and
 calibrating the camera for real world distance measurement by determining a perpendicular vector to the ground line based on the internal camera matrix.

2. The method of claim 1, wherein the image or a subsequent image from the camera of the environment includes a first object having a known height and a second object having an unknown height, further comprising:
 determining a height metric of the second object using the perpendicular vector to the ground line and the known height of the first object.

3. The method of claim 2, wherein determining the height metric of the second object comprises:
 determining an intersection between the ground line and a vector passing through a first ground point on the first object and a second ground point on the second object;
 calculating a virtual line in a plane comprising the first object and the second object that is perpendicular to the ground line and includes the intersection;
 determining a homography matrix that transforms the virtual line to a canonical form;
 calculating a first rectified top point on the first object and second rectified top point on the second object using the homography matrix; and
 calculating the height metric of the second object based on the first rectified top point and the first ground point of the first object and the second rectified top point and the second ground point of the second object.

4. The method of claim 2, wherein the height metric of the second object is proportional to the known height of the first object.

5. The method of claim 2, wherein the first object is a stationary object in the environment.

6. The method of claim 1, wherein the first set of parallel lines intersect with the second set of parallel lines.

7. The method of claim 1, wherein the first set of parallel lines are perpendicular to the second set of parallel lines in the real world ground plane.

8. An apparatus for estimating a real world distance in an image, comprising:
 one or more memories; and
 one or more processors coupled with the one or more memories, wherein the one or more processors are configured, individually or in combination, to:
  obtain an image from a camera installed in an environment;
  identify, in the image, a first set of parallel lines on a real world ground plane and a second set of parallel lines on the real world ground plane;
  determine a first intersection point of the first set of parallel lines and a second intersection point of the second set of parallel lines;
  identify a ground line connecting the first intersection point and the second intersection point;
  estimate an internal camera matrix based on a focal length and an image size associated with the camera; and
  calibrate the camera for real world distance measurement by determining a perpendicular vector to the ground line based on the internal camera matrix.

9. The apparatus of claim 8, wherein the image or a subsequent image from the camera of the environment includes a first object having a known height and a second object having an unknown height, wherein the processor is further configured to:
 determine a height metric of the second object using the perpendicular vector to the ground line and the known height of the first object.

10. The apparatus of claim 9, wherein to determine the height metric of the second object comprises to:

determine an intersection between the ground line and a vector through a first ground point on the first object and a second ground point on the second object;

calculate a virtual line in a plane comprising the first object and the second object that is perpendicular to the ground line and includes the intersection;

determine a homography matrix that transforms the virtual line to a canonical form;

calculate a first rectified top point on the first object and second rectified top point on the second object using the homography matrix; and calculate the height metric of the second object based on the first rectified top point and the first ground point of the first object and the second rectified top point and the second ground point of the second object.

11. The apparatus of claim 9, wherein the height metric of the second object is proportional to the known height of the first object.

12. The apparatus of claim 9, wherein the first object is a stationary object in the environment.

13. The apparatus of claim 8, wherein the first set of parallel lines intersect with the second set of parallel lines.

14. The apparatus of claim 8, wherein the first set of parallel lines are perpendicular to the second set of parallel lines in the real world ground plane.

15. An non-transitory computer-readable medium storing instructions for estimating a real world distance in an image, wherein the instructions are executable by one or more processors to:

obtain an image from a camera installed in an environment;

identify, in the image, a first set of parallel lines on a real world ground plane and a second set of parallel lines on the real world ground plane;

determine a first intersection point of the first set of parallel lines and a second intersection point of the second set of parallel lines;

identify a ground line connecting the first intersection point and the second intersection point;

estimate an internal camera matrix based on a focal length and an image size associated with the camera; and calibrate the camera for real world distance measurement by determining a perpendicular vector to the ground line based on the internal camera matrix.

16. The non-transitory computer-readable medium of claim 15, wherein the image or a subsequent image from the camera of the environment includes a first object having a known height and a second object having an unknown height, further comprising instructions executable by the one or more processors to:

determine a height metric of the second object using the perpendicular vector to the ground line and the known height of the first object.

17. The non-transitory computer-readable medium of claim 16, wherein an instruction to determine the height metric of the second object comprises instructions executable by the one or more processors to:

determine an intersection between the ground line and a vector through a first ground point on the first object and a second ground point on the second object;

calculate a virtual line in a plane comprising the first object and the second object that is perpendicular to the ground line and includes the intersection;

determine a homography matrix that transforms the virtual line to a canonical form;

calculate a first rectified top point on the first object and second rectified top point on the second object using the homography matrix; and calculate the height metric of the second object based on the first rectified top point and the first ground point of the first object and the second rectified top point and the second ground point of the second object.

18. The non-transitory computer-readable medium of claim 16, wherein the height metric of the second object is proportional to the known height of the first object.

19. The non-transitory computer-readable medium of claim 16, wherein the first object is a stationary object in the environment.

* * * * *